United States Patent [19]
Hartman

[11] Patent Number: 5,847,704
[45] Date of Patent: Dec. 8, 1998

[54] METHOD OF CONTROLLING AN ELECTRONICALLY GENERATED VISUAL DISPLAY

[75] Inventor: Hollister A. Hartman, Northville, Mich.

[73] Assignee: UT Automotive Dearborn, Dearborn, Mich.

[21] Appl. No.: 707,345

[22] Filed: Sep. 3, 1996

[51] Int. Cl.[6] .................................................. G06F 15/00
[52] U.S. Cl. ...................... 345/339; 345/126; 345/127; 340/439; 340/990; 707/1
[58] Field of Search ................................. 345/326, 334, 345/339, 340, 342, 344, 345, 348, 349, 7, 113, 146, 173, 121, 126, 127; 364/424.01, 424.02, 424.06; 340/438, 439, 461, 425, 980, 990, 995; 701/1

[56] References Cited

U.S. PATENT DOCUMENTS

| | | | |
|---|---|---|---|
| 5,237,653 | 8/1993 | Noguchi et al. | 345/345 |
| 5,404,442 | 4/1995 | Foster et al. | 345/348 |
| 5,497,454 | 3/1996 | Bates et al. | 345/344 |
| 5,539,429 | 7/1996 | Yano et al. | 345/173 |
| 5,568,600 | 10/1996 | Kabe | 395/137 |
| 5,648,755 | 7/1997 | Yagihashi | 340/439 |
| 5,664,082 | 9/1997 | Chen et al. | 345/436 |

FOREIGN PATENT DOCUMENTS

| | | |
|---|---|---|
| 0703111A2 | 9/1995 | European Pat. Off. . |
| 4033832A1 | 10/1989 | Germany . |

OTHER PUBLICATIONS

Knoll et al.: "Advanced Integrated Driver Information Systems"; measurement & Control, vol. 25, No. 9, Nov. 1992, London, GB, pp. 264–268, XP000320446.

*Primary Examiner*—Huynh Ba
*Attorney, Agent, or Firm*—Howard & Howard

[57] ABSTRACT

A graphical user interface system for use in a vehicle includes a method of controlling a visual display. The display always includes images of selected items such as a speedometer, odometer and fuel gauge. When other displays are desired, the images of the selected items are moved to sides of the screen and rotated about an axis that is generally parallel to the screen. The moved and rotated images are simultaneously displayed with the desired display placed in the central portion of the screen.

11 Claims, 3 Drawing Sheets

METHOD OF CONTROLLING AN ELECTRONICALLY GENERATED VISUAL DISPLAY

BACKGROUND OF THE INVENTION

This invention relates to a graphical user interface for use inside of vehicles. More particularly, this invention relates to a method of controlling a visual display in a system having a graphical user interface that provides a user visual access to a variety of features associated with a subsystem of a vehicle without requiring the user to page through a series of menus to access those functions.

A variety of graphical user interfaces have been developed for facilitating a user's access and control of electronic products and systems. More recently, attempts have been made to integrate graphical user interfaces into vehicles. Incorporating a graphical user interface into a vehicle presents special problems. For example, a computer operator within an office environment typically has the luxury of being able to page through a series of menus to access a desired application. The same is not true, however, for a driver within a vehicle. A driver of a vehicle must be able to devote as much attention as possible to the road and driving conditions to avoid traffic accidents. If a driver were required to page through a series of menus to access various electronic functions and subsystems within the vehicle, the potential for a traffic accident is increased. Therefore, there is a need for a graphical user interface, which is adapted to be used in a vehicle, that provides ready access to a variety of adjustable features associated with an electronically controllable subsystem within the vehicle without requiring the driver to page through a series of menu screens.

An additional difficulty is introduced when the display screen is used to display images of a speedometer and fuel gauge dial, for example. In the United States, federal standards mandate that speedometer, odometer and fuel level gauges be visible at all times to a driver. Accordingly, a substantial amount of screen space can be taken up by the required dials. Prior to this invention, two approaches to solving this problem have been proposed. First, it has been proposed to dedicate one-half of a display screen to the mandatory gauges. A significant drawback to this approach is the loss of at least one-half of the available display screen area. The reduced display screen area that is available for other displays causes over-simplification of screen displays, which may result in requiring a driver to page through a series of menus for any given function. This result is undesirable as generally discussed above. A further drawback of the first proposed approach is that it is difficult to develop an aesthetically pleasing division of the screen in many circumstances.

Another suggested approach is to use purely digital readouts of the analog gauges. Drawbacks to this approach include the inability to provide indications of trends and relative amounts, which can readily be accomplished with a moving pointer of an analog gauge. Further, most vehicle drivers seem to prefer analog dials over digital readouts.

This invention addresses the need of providing a versatile screen display that facilitates constant display of mandatory gauges along with other desirable information.

SUMMARY OF THE INVENTION

The method of this invention of controlling a visual display in a system having a display screen and an electronic controller for controlling the visual display includes several basic steps. First, a plurality of images are displayed over a substantial portion of the screen. A second display is generated that will also be displayed on the screen. Next, selected ones of the plurality of images are moved from the substantial portion of the screen and reduced in size such that the substantial portion of the screen does not contain any of the displayed images. Lastly, the second display is displayed over the substantial portion of the screen with the selected images displayed near the second display.

In the preferred embodiment, the selected plurality of images include the speedometer, and fuel gauges, respectively. The speedometer, odometer and fuel gauge images preferably are analog dials. The analog dials preferably are moved to alternate sides of the screen and rotated about an axis that is generally parallel with the screen. Accordingly, the dials are moved to the side off of the substantial portion of the screen and rotated so that the dials appear to protrude inwardly toward the screen.

The various features and advantages of this invention will become apparent to those skilled in the art from the following detailed description of a preferred embodiment. The drawings that accompany the detailed description can be described as follows.

DETAILED DESCRIPTION OF THE PREFERRED EMBODIMENT

Figure 1:
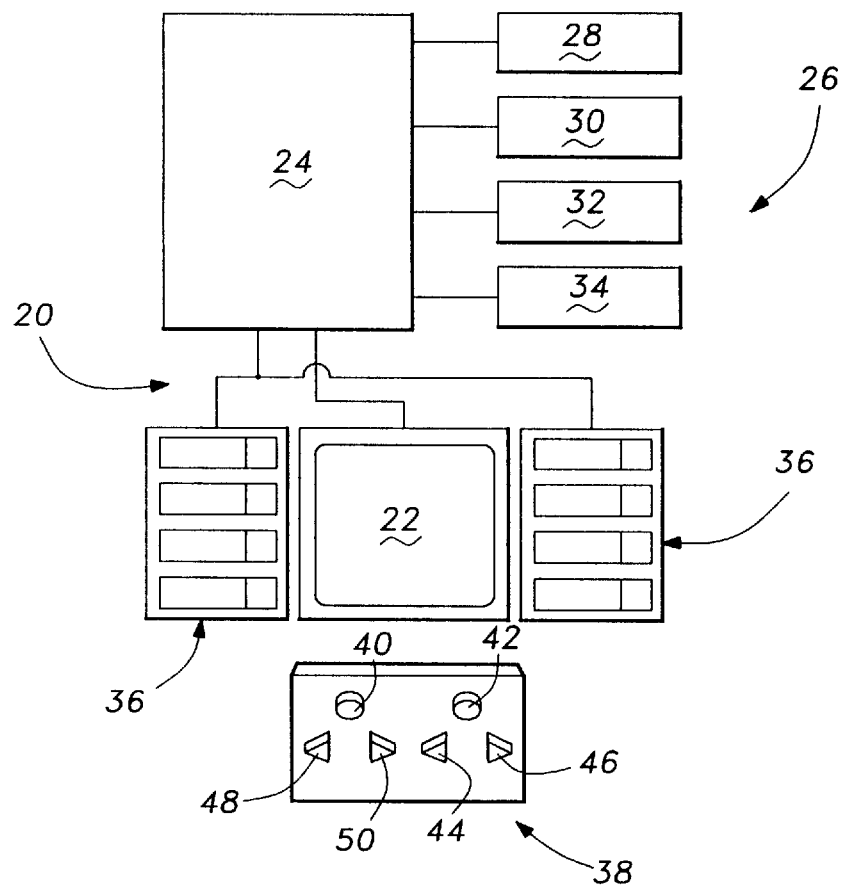
FIG. 1 is a schematic illustration of a graphical user interface system designed according to this invention.

FIG. 1 illustrates a graphical user interface system 20 that is designed to be placed within a vehicle. A display screen 22 displays a variety of information for a driver and/or passenger of a vehicle. An electronic controller 24 controls what is shown on the display screen 22. The electronic controller 24 is coupled to a plurality of vehicle subsystems 26. Examples of subsystems include a radio 28, a cruise control 30, the heating, ventilation and air conditioning (HVAC) system 32 and a cellular telephone 34. The various subsystems of the vehicle are schematically illustrated in block diagram form because the subsystems themselves are conventional.

A plurality of selection switches 36 enable a user to select one of the subsystems to be adjusted. A set of switches 38 enable a user of the system to modify the operation of a selected subsystem. In the illustrated embodiment, at least one multi-purpose adjustment switches 40 and 42 are included. The adjustment 40 and 42 preferably are push-turn knobs that can be pressed or rotated. The preferred embodiment also includes a plurality of control switches. In the illustrated embodiment, control switches 44 and 46 are grouped as one set while control switches 48 and 50 are grouped as a second set. The grouping of the control switches provides a convenient way of having bidirectional control of a function.

It is desirable to reduce the number of switches associated with a graphical user interface system. With previous attempts, however, reducing the number of switches resulted in causing a user to page through a series of menu screens to locate and make adjustments to various functions. The system 20, designed according to this invention, uses a reduced number of switches and provides the significant advantage of eliminating a driver's need to navigate through a series of menus. Further, this invention allows instant activation of the vehicle subsystems at a single press of a button. The specific arrangement and type of multi-purpose adjustment 40, 42 and control switches 44, 46, 48 and 50 provides the ability to easily locate and operate the switches without distracting a driver from the task of driving the vehicle.

The selection switches 36 preferably are arrayed together alongside the display screen 22. Alternatively, the selection switches 36 can be placed on an angled, hand-contoured shelf near the display or on a collar behind the steering wheel, for example. In another embodiment, the selection, adjustment and control switches are supported on the steering wheel for easy access.

Each of the selection switches 36 preferably is a spring-loaded rocker switch. Each switch preferably is programmed to activate a single subsystem and, therefore, is dedicated to one subsystem within the vehicle. Having dedicated selection switches 36 provides the ability to label the switches in a manner that makes them readily perceivable by a driver. If the display screen 22 is within a "no-lean reach" of a driver, it is most preferred to place the selection switches 36 along side the display screen 22 generally as illustrated.

Figure 2:
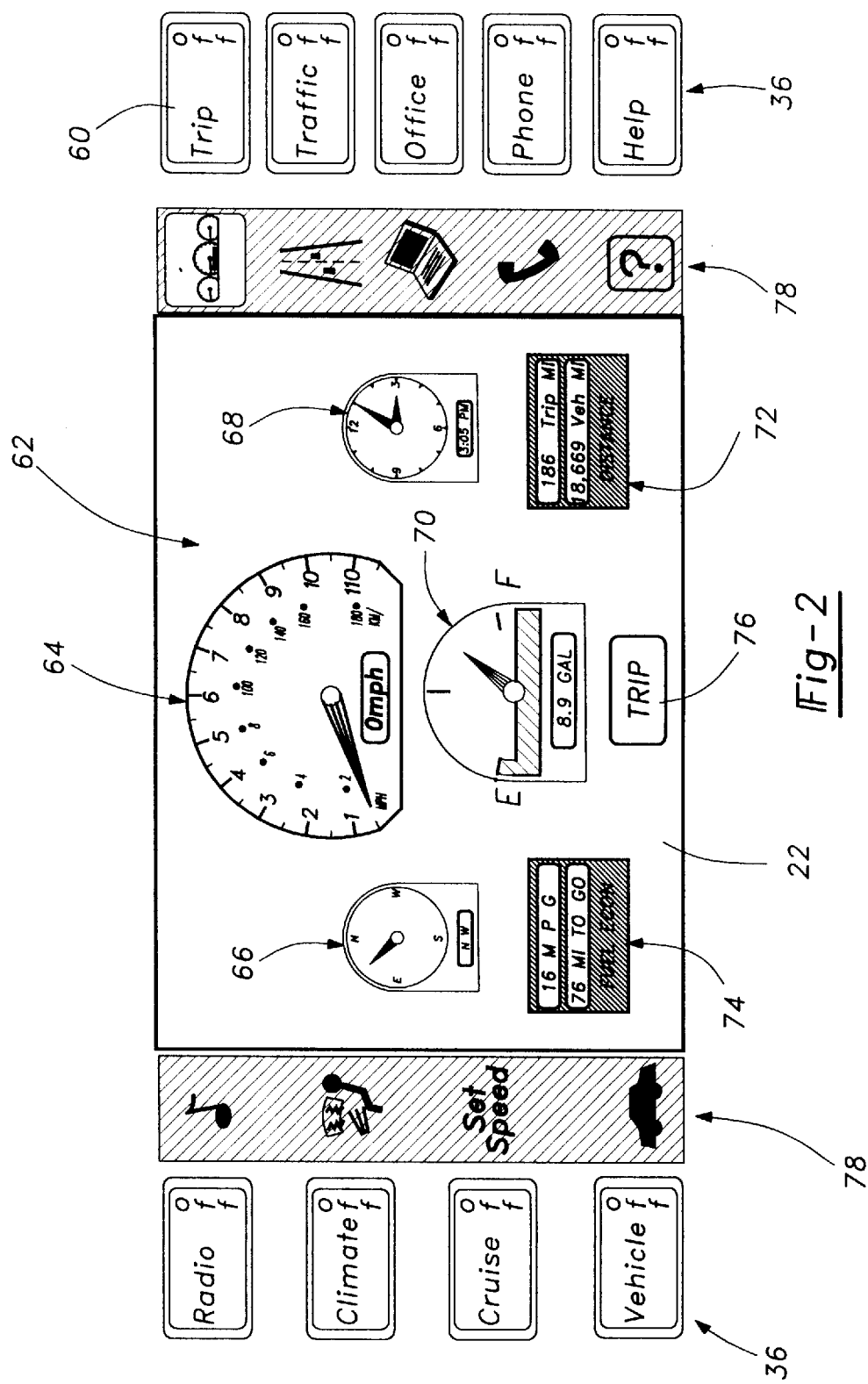
FIG. 2 is a diagrammatic illustration of a screen display associated with this invention.

FIG. 2, illustrates a displayed image on the screen 22 as a result of the driver pressing the selection switch 60. The display 62 includes an image of the speedometer dial 64, a compass 66, a clock 68, an analog fuel gauge 70, an odometer 72 and a fuel economy rating 74. An indicator 76 indicates which function or subsystem is being displayed on the screen 22. The display 62 preferably also includes a plurality of icons 78 that visually indicate the available subsystems that can be displayed upon manipulation of an appropriate selection switch 36.

Figure 3:
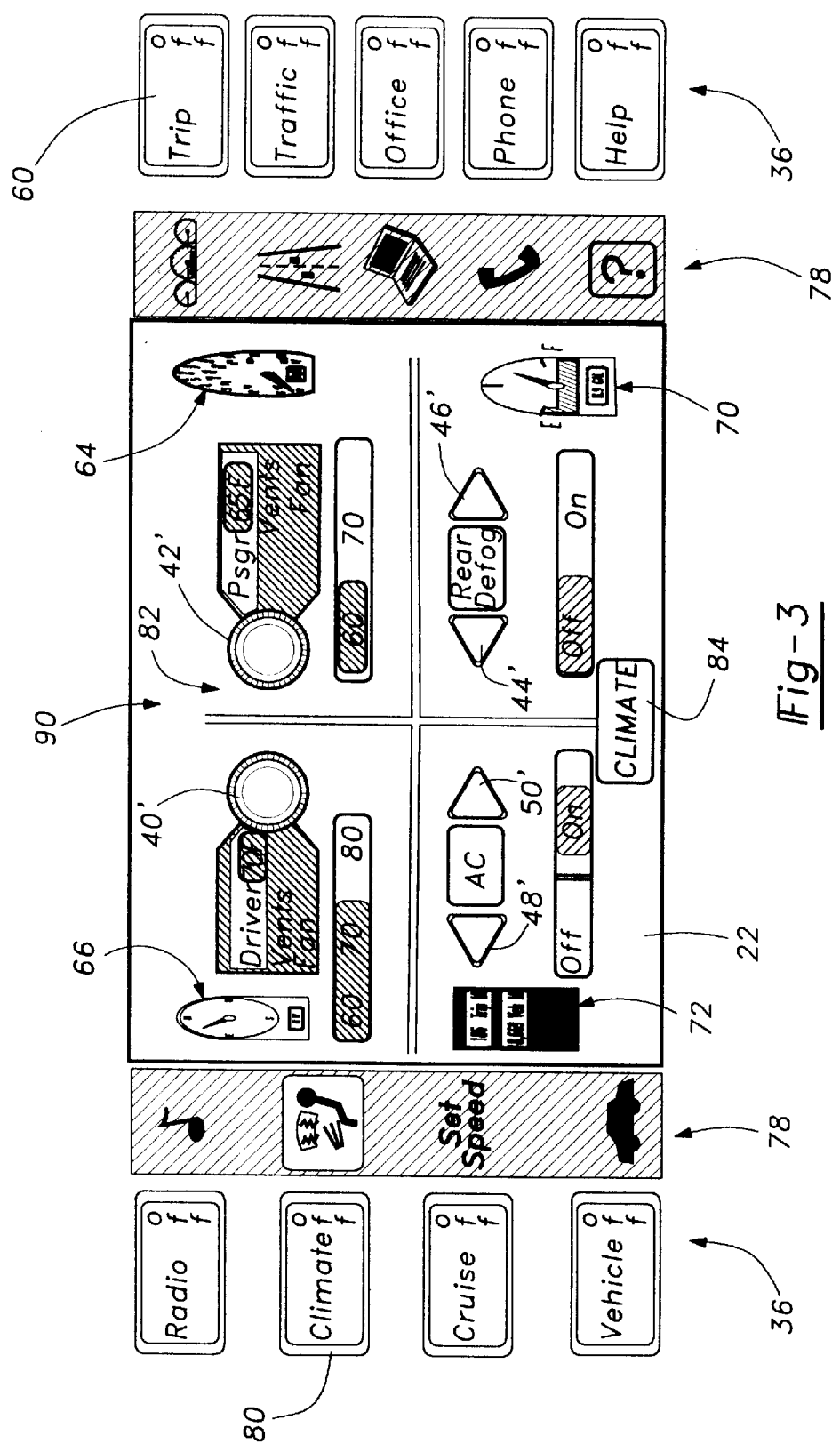
FIG. 3 is a diagrammatic illustration of another screen display associated with this invention.

Referring now to FIG. 3, assuming the driver chooses to adjust the heating, ventilation and air conditioning subsystem of the vehicle, she presses an appropriate surface on the selection switch 80. A second display 82 is generated by the controller 24, which will be displayed on the screen 22. As can be seen in FIG. 2, when the display 62 is on the screen 22, the displayed items (such as the speedometer) cover over a substantial portion of the screen. In many circumstances, it is mandatory that at least the fuel gauge 70, speedometer 64 and odometer 72 be displayed on the display screen 22 at all times. Accordingly, before the display 82 can be displayed on the screen 22, the display 62 must be altered.

Before the display 82 is displayed on the screen 22, several of the displayed images from the display 62 are selected to remain on the screen 22. In most circumstances, at least the speedometer 64, fuel gauge 70 and odometer 72 will remain on the screen 22 at all times. In the illustrated example, the compass 66 also remains on the screen.

The displayed images of the selected items are moved to opposite sides of the screen 22. The displayed images of the selected items are then rotated about an axis that is generally parallel with the screen. Accordingly, the selected items are displayed such that they appear to protrude into the screen 22, as generally illustrated in FIG. 3. It is also possible to reduce the physical size of any one or more of the selected items before moving and rotating that item to a position as illustrated in FIG. 3. Once the selected items are moved appropriately, the second display 82 is displayed over the substantial portion of the screen 22. A new indicator 84 indicates the selected subsystem that is currently displayed over the substantial portion of the screen 22.

The second display 82 includes images of the adjustment and control switches described above. The second display 82 provides a graphical interface that enabless a driver, or passenger, of a vehicle to adjust the selected subsystem that is displayed on the screen.

The user of the system could have other second displays generated by choosing another one of the selection switches 36. Alternatively, by again pressing the selection switch 60, the display of FIG. 2 would return to the screen 22.

Given this specification, one skilled in the art can select an appropriate commercially available microprocessor or develop circuitry to realize the controller 24. Similarly, given this specification, one skilled in the art can develop specific code for programming the controller 24 to accomplish the results described above.

The above description is exemplary rather than limiting in nature. For example, a variety of arrangements of switches and could be implemented. Similarly, the arrangement of the display on the display screen can be varied from the illustrations discussed above. Those skilled in the art will realize that variations and modifications of the disclosed embodiment will not necessarily depart from the purview and spirit of this invention. Accordingly, the legal scope accorded to this invention can only be determined by studying the appended claims.

What is claimed is:

1. A method of controlling a visual display in a vehicle display system having a display screen and an electronic controller for controlling the visual display, comprising the steps of:

(a) displaying a plurality of images over a substantial portion of the screen;

(b) generating a second display to be displayed on the screen;

(c) selecting certain ones of the plurality of images that contain information that is useful for a driver to operate the vehicle and moving the selected images from the substantial portion of the screen and reducing a size of the selected images while still displaying the useful information of the selected images in a manner that is easily recognized by the driver of the vehicle such that the substantial portion of the screen does not contain any displayed images; and (d) displaying the second display over the substantial portion of the screen with the selected images displayed near the second display.

2. The method of claim 1, wherein step (C) includes reducing a size of the selected images by rotating each selected image about an axis that is generally parallel with the screen such that a face of each image is displayed at an angle relative to the screen.

3. The method of claim 1, wherein step (A) is performed by displaying a plurality of analog dials on the screen wherein the analog dials include a speedometer and a fuel gauge, respectively, each of the dials having a generally planar face that is displayed generally parallel to the screen.

4. The method of claim 3, wherein step (C) is performed by selecting the speedometer, fuel gauge and odometer, respectively, and moving those images to at least one side of the screen and rotating the images such the generally planar faces are non-parallel to the screen.

5. The method of claim 4, wherein step (C) is performed by the further substep of reducing the size of the displayed dials.

6. The method of claim 5, wherein step (C) is performed by the further substep of deleting any other displayed images from the screen.

7. The method of claim 1, wherein the second display is displayed over a central portion of the screen and the selected images are moved to one side of the screen such that the selected images appear on a side of the second display on the screen, simultaneously.

8. A method of controlling an electronically generated display on a display screen within a vehicle, comprising the steps of:
   (a) generating a first display including a plurality of displayed items;
   (b) displaying the first display over a substantial portion of the screen;
   (c) generating a second display;
   (d) altering the first display including selecting certain ones of the displayed items that contain information that is useful for a driver to operate the vehicle and moving the selected displayed items from the substantial portion of the screen and reducing an amount of screen space occupied by the selected items while still displaying the useful information of the selected items in a manner that is easily recognized by the driver of the vehicle; and
   (e) displaying the second display on the substantial portion of the screen simultaneously with the selected items from the first display.

9. The method of claim 8, wherein the selected items include images of a vehicle speedometer, odometer, and fuel gauge, respectively.

10. The method of claim 9, wherein step (D) is performed by moving the selected images from the substantial portion of the screen onto side portions of the screen and rotating the images about an axis that is generally parallel to the screen such that the images appear to protrude partially into the screen and the images cover a smaller portion of the screen than in step (B).

11. A system for controlling a visual display within a vehicle, comprising:
   a display screen positioned within the vehicle so that it is observable by a driver of the vehicle; and
   an electronic controller that moves selected portions of a first displayed image on said display screen from a substantial portion of said screen and reduces a size of said selected portions of said image while still displaying useful information provided by said selected portions in a manner that is easily recognized by the driver of the vehicle such that said substantial portion of said screen does not contain any displayed images, and wherein said controller displays a second display over said substantial portion of said screen with said movement and reduced portions of said first displayed image near said second display.

* * * * *